United States Patent [19]

Matrick

[11] Patent Number: 5,141,556
[45] Date of Patent: Aug. 25, 1992

[54] PENETRANTS FOR AQUEOUS INK JET INKS

[75] Inventor: Howard Matrick, Highlands, N.J.

[73] Assignee: E. I. Du Pont de Nemours and Company, Wilmington, Del.

[21] Appl. No.: 714,879

[22] Filed: Jun. 13, 1991

[51] Int. Cl.$^5$ ............................................. C09D 11/02
[52] U.S. Cl. ........................................ 106/20; 106/22; 106/23
[58] Field of Search ..................... 106/20, 22, 23

[56] References Cited

U.S. PATENT DOCUMENTS

| | | | |
|---|---|---|---|
| 4,170,482 | 10/1979 | Mansukhani | 106/20 |
| 4,381,946 | 5/1983 | Uehara et al. | 106/22 |
| 4,957,553 | 9/1990 | Koike et al. | 106/20 |
| 5,006,170 | 4/1991 | Schwartz et al. | 106/22 |

Primary Examiner—William R. Dixon, Jr.
Assistant Examiner—Helene Klemanski

[57] ABSTRACT

An ink for ink jet printers which comprises an aqueous carrier medium, pigment dispersion or dye and a diol penetrant. The latter is an aliphatic diol having at least 6 carbon atoms, a solubility in water of at least 4.5 parts in 100 parts of water at 25° C. and is selected from the group consisting essentially of:

(1) compounds wherein at least 2 carbon atoms are attached as substituents to the main chain, and
(2) Hexene [1,2-]diols.

The pigment dispersion consists of pigment particles and a dispersant, preferably a polymeric dispersant having a hydrophilic segment and a segment that links to the pigment. These inks exhibit rapid drying, are storage stable, have reliable performance and give images having good print quality.

36 Claims, No Drawings

PENETRANTS FOR AQUEOUS INK JET INKS

FIELD OF THE INVENTION

This invention relates to aqueous inks for ink jet printers, and, more particularly, to aqueous, colored inks containing penetrants.

BACKGROUND OF THE INVENTION

Ink jet printing is a non-impact method for recording information in response to an electronic signal, such as that generated by a computer. In the printer the electronic signal produces droplets of ink that are deposited on a substrate such as paper or transparent film. Ink jet printers have found broad commercial acceptance due to their reliability, relatively quiet operation, graphic capability, print quality and low cost. Thermal or bubble jet drop-on-demand printers have been especially successful and have found broad application as output for personal computers in the office and the home.

Both dyes and pigments have been used as ink colorants for ink jet printers. However, dyes have several disadvantages. They are water-soluble and remain so after drying. They are redissolved by contact with water and will run when exposed to a water spill. Also dye images smear on contact with felt pen markers. In addition they exhibit poor light stability relative to pigments and are known to fade even under conditions of office fluorescent lighting. Thus, there are several disadvantages with the use of dye-based ink jet inks, many of which prohibit their use in applications requiring moisture resistance and greater light stability. Pigments can be used as ink colorants for ink jet printers. Pigment-based inks contain cosolvents which provide improved water and smear resistance and improved lightfastness compared to dyes. However, the presence of these cosolvents which include penetrants also tends to destabilize pigment dispersions. Thus, pigments are a useful alternative to dyes provided the pigment dispersions can be made stable to flocculation and settling.

Three major concerns dominate ink jet ink technology. They are (1) the drying rate, (2) print quality, and (3) reliability. Drying rate determines the throughput rate and therefore productivity.

One major deficiency of thermal ink jet printers is their relatively slow printing speed compared to printers using competing technologies. A major obstacle is the ink drying rate. In a sheet fed printer, the ink must be dry before the succeeding sheet contacts it or the ink will smear.

Drying occurs by both evaporation and penetration. Evaporation is determined by solvent vapor pressure whereas penetration is determined by interfacial energy between the ink and the paper and the porosity of the print media. The use of penetrants is known in the art as a means to increase the rate of penetration of inks. However, the known penetrants such as Butyl Carbitol ®, cause pigment dispersions to flocculate and therefore cannot be used in pigmented ink jet inks.

Water-based pigment dispersions are well known in the art, and have been used commercially for applying films, such as paints, to various substrates. The pigment dispersion is generally stabilized by either a non-ionic or ionic technique. Ink jet inks containing pigment dispersions stabilized with AB or BAB block copolymers are also known.

Print quality is defined by factors such as optical density, edge acuity/feathering, spray and other artifacts, dots/square inch, and drop volume. Some reliability issues are decap or crust time which is defined as the time span over which a pen can be exposed to the atmosphere without failing to print, storage stability of the ink as seen by physical or chemical changes, compatibility with equipment material, and robustness towards variability in firing conditions.

The three major concerns discussed above often compete with one another. For example, methods for decreasing drying rate will adversely affect either print quality or reliability. Using a more volatile cosolvent will decrease drying time but also decrease decap time.

Accordingly, a need exists for penetrants that will increase ink drying without destabilizing pigment-based inks.

The cosolvents or penetrants of this invention are able to increase penetration thereby decreasing drying rate without decreasing pigment dispersion stability or reduce decap time. In addition the penetrants of this invention provide maximum penetration and spreading which is highly desirable in a small drop volume ink cartridge.

A major advantage of the use of the penetrants claimed in this invention is rapid media penetration along with compatibility with aqueous pigment dispersions. The penetrants, however, are also useful in dye-based inks.

SUMMARY OF THE INVENTION

The invention relates to an aqueous ink jet ink composition comprising:
(a) an aqueous carrier medium,
(b) a pigment dispersion or dye; and
(c) an aliphatic diol penetrant compound having at least 6 carbon atoms, a solubility in water of at least 4.5 parts in 100 parts of water at 25° C., and selected from the group consisting essentially of
(1) compounds wherein at least 2 carbon atoms are attached as substituents to the main chain, and
(2) Hexene [1,2-] diols.

The inks of the invention are extremely stable, have low viscosity, exhibit excellent print quality, provide excellent smear resistance after drying and acceptable crusting time. They may be used with a variety of ink jet printers such as continuous, piezoelectric drop-on-demand and thermal or bubble jet drop-on-demand, and are particularly adapted for use in thermal ink jet printers.

DETAILED DESCRIPTION OF THE INVENTION

The invention relates to an ink jet ink composition which is particularly suited for use in ink jet printers in general, and thermal ink jet printers in particular. The ink jet ink composition encompasses both pigmented-based inks and dye-based inks. The pigmented inks comprise an aqueous carrier medium, a diol penetrant and a pigment dispersion which is an aqueous dispersion of pigment particles, stabilized by polymeric dispersants, that are stable over long periods, both in storage and in the printer. The dye-based inks comprise an aqueous carrier medium, a dye and a diol penetrant. The inks may be adapted to the requirements of a particular ink jet printer to provide a balance of light stability, smear resistance, viscosity, surface tension, high optical density, and crust resistance.

The aqueous carrier may contain an organic water soluble compound other than the penetrant as well as water.

Diols of less than 6 carbon atoms are water soluble but do not promote penetration (see Control 5, Examples, Neopentyl Glycol).

Diols with too many carbon atoms may be effective penetrants but can destabilize the pigment dispersions and are likely to be insoluble in the aqueous ink. This can be illustrated as follows:

| Penetrant | Water Solubility | Stability delta nm |
|---|---|---|
| 2-Ethyl-1,3-hexanediol | 4.2% at 20° C.[a] | 42 |
| 1,2,4-Trimethyl-1,3-pentanediol | 1.9% at 25° C.[a] | 60 |
| 2,2-Diethyl-1,3-propanediol | 25% at 20° C.[a] | 17 |

[a]Industrial Solvent Handbook, E. W. Flock, 3rd Edition, Noyes Data Corp., Park Ridge NJ All three compounds are effective penetrants, but the first two cause excessive aggregation/flocculation upon storage and are not useable in pigmented inks. They both have solubilities in water of less than 4.5%. A change in aggregate size of less than 20 nm is considered acceptable stability (see Table 3, Examples).

It is important that the penetrant be substantially soluble at the level of use, i.e., if the ink formulation requires 5% of the penetrant to obtain useful penetration rates, then the penetrant must have a solubility nearly equal to or greater than the penetrant use level. If the penetrant forms a third phase in addition to the dispersed pigment and the aqueous phase, then the pigment dispersion is likely to become unstable and settle during storage. When a second organic cosolvent is present, a somewhat lower solubility in water than the use level may be acceptable since the presence of a second cosolvent promotes penetrant solubility.

PENETRANT OR COSOLVENT

The inks of the invention contain penetrants or cosolvents that are able to decrease drying time without decreasing pigment dispersion stability or decap time. The penetrants include aliphatic diol compounds having at least 6 carbon atoms, a solubility in water of at least 4.5 parts in 100 parts of water at 25° C., and selected from the group consisting essentially of (1) compounds wherein at least 2 carbon atoms are attached as substituents to the main chain, and
(2) 1,2-Hexene diols.

Compounds included in (1) are those compounds wherein the carbon is part of a single side chain or multiple side chains, for example, 2,2-dialkyl-1,3-diols. More specifically 2-ethyl-2-methyl-1,3-propane diol is a compound where 3 carbon atoms on side chains are attached to the main chain.

Alternatively, the penetrant compound may be an aliphatic diol with the general formula:

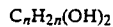

wherein n is at least 6, preferably 6–8, and at least 2 carbon atoms are attached as substituents to the main chain.

In one embodiment of (a) at least 2 carbon atoms are attached to the same main chain carbon atom. However, as shown in the Comparative Examples of Table 2, compounds such as hexylene glycol (control 4) which can be used as part of the carrier medium, are not as effective as penetrants.

Some useful diol penetrants are disclosed below:
1) 2,2-Dialkyl-1,3-diols having the following formula:

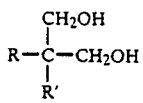

wherein R is —H, —CH$_3$ or —C$_2$H$_5$, and R' is —C$_2$H$_5$, —C$_3$H$_7$ or —C$_4$H$_9$.
Some specific 1,3-diols include:

| Compound | R | R' |
|---|---|---|
| 2-Ethyl-2-methyl-1,3-propanediol | —CH$_3$ | —C$_2$H$_5$ |
| 2,2-Diethyl-1,3-propanediol | —C$_2$H$_5$ | —C$_2$H$_5$ |
| 2-Methyl-2-propyl-1,3-propanediol | —CH$_3$ | —C$_3$H$_7$ |

2) Compounds in which at least one hydroxyl group of the diol are attached to a secondary or tertiary carbon atom.

2a) 2,4- and 2,5-Diols having the following formula:

wherein n=1–2.
Some specific 2,4- and 2,5-diols include:

| Compound | n = |
|---|---|
| 2,4-Dimethyl-2,4-pentanediol | 1 |
| 2,5-Dimethyl-2,5-hexanediol | 2 |

2b) 3,3-Dimethyl-1,2-butanediol
2c) Hexene-1,2-diols of the general formula:

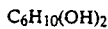

A specific example of a hexene-1,2-diol is 5-hexene-1,2-diol.

A major advantage of using the penetrants described in this invention is their compatibility with pigment dispersions. However, the penetrants can also be used in dye-based ink to impart rapid penetration of aqueous dye-based inks into the paper.

The pigment dispersion comprises a pigment and a dispersant, preferably a polymeric dispersant.

POLYMERIC DISPERSANTS

Polymeric dispersants suitable for practicing the invention include AB or BAB block copolymer wherein the A block is hydrophobic and serves to link with the pigment, and the B block is hydrophilic and serves to disperse the pigment in the aqueous medium. Selection of the polymer for a specific application will depend on the selected pigment and aqueous medium. In general, the polymer is an AB or BAB block copolymer wherein
(a) the A segment is a hydrophobic homopolymer or copolymer of an acrylic monomer having the formula:

$CH_2=C(X)(Y)$ wherein X is H or $CH_3$; and Y is $C(O)OR_1$, $C(O)NR_2R_3$, or CN, wherein $R_1$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of
(1) an acrylic monomer having the formula $CH_2=C(X)(Y_1)$, wherein X is H or $CH_3$; and $Y_1$ is C(O)OH, $C(O)NR_2R_3$, $C(O)OR_4NR_2R_3$ or $C(OR_5)$; wherein $R_2$ and $R_3$ are hydrogen or an alkyl, aryl, or alkylaryl group having 1 to 9 carbon atoms; $R_4$ is an alkyl diradical having 1 to 5 carbon atoms; and $R_5$ is an alkyl diradical having 1 to 20 carbon atoms and optionally containing one or more hydroxyl or ether groups; or
(2) a copolymer of the acrylic monomer of (1) with an acrylic monomer having the formula:

$CH_2=C(X)(Y)$ where X and Y are the substituent groups defined for the A segment; the B segment having an average molecular weight of at least approximately 300 and being water soluble.

The B block(s) generally will constitute 10 to 90%, preferably 25 to 65%, of the entire block polymer by weight.

The A block is a polymer or copolymer prepared from at least one acrylic monomer having the formula set forth above. The $R_1$, $R_2$ and $R_3$ groups optionally may contain hydroxy, ether, $OSi(CH_3)_3$ groups, and similar substituent groups. Representative monomers that may be selected include, but are not limited to, the following: methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, benzyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate(GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethyl-siloxyethyl acrylate, glycidyl acrylate, p-tolyl acrylate, and sorbyl acrylate. Preferred A blocks are homopolymers and copolymers prepared from methyl methacrylate, butyl methacrylate, 2-ethylhexyl methacrylate, or copolymers of methyl methacrylate with butyl methacrylate.

The A block also may contain a hydrophilic monomer such as $CH_2=C(X)(Y)'$, wherein X is H or $CH_3$ and Y' is C(O)OH, $C(O)NR_2R_3$, $C(O)OR_4NR_2R_3$, $C(OR_5)$, or their salts, wherein $R_2$ and $R_3$ may be H or C1 to C9 alkyl, aryl, or alkylaryl, $R_4$ is a C1 to C5 alkyl diradical, and $R_5$ is a C1 to C20 alkyl diradical which may contain hydroxy or ether groups, to provide some changes in solubility. However, there should not be enough hydrophilic monomer present in the A block to render it, or its salt, completely water soluble.

The B block is a polymer prepared from at least one acrylic monomer having the formula provided above. Representative monomers include methacrylic acid (MAA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Homopolymers or copolymers of methacrylic acid or dimethylaminoethyl methacrylate are preferred.

The acid containing polymer may be made directly or may be made from a blocked monomer with the blocking group being removed after polymerization. Examples of blocked monomers that generate acrylic or methacrylic acid after removal of the blocking group include: trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

The B block may be a copolymer of an acid or amino containing monomer with other monomers, such as those used in the A block. The acid or amino monomer may be used in a range of 10 to 100%, preferable in a range of 20 to 100%, of the B block composition. The B block(s) generally will constitute 10 to 90%, preferably 25 to 65%, of the entire block polymer by weight.

Block copolymers that are useful in practicing the invention have a number average molecular weight below 20,000, preferably below 15,000, and typically in the range of 1,000 to 3,000. Preferred block copolymers have number average molecular weights in the range of 500 to 1500 for each A and B block.

Representative AB and BAB block polymers that may be selected include the following, wherein the values recited represent the degree of polymerization of each monomer. A double slash indicates a separation between blocks and a single slash indicates a random copolymer. For example, MMA//MMA/MMA 10//5/7.5 is an AB block polymer with an A block of MMA that is 10 monomer units long, molecular weight of 1000 and a B block that is a copolymer of MMA and MAA with 5 monomer units of MMA and 7.5 units of MAA; molecular weight of the B block is 1145.

| AB BLOCK POLYMER | MOL. WEIGHT |
|---|---|
| EHMA//EHMA/MAA | |
| 3//3/5 | 1618 |
| 5//2.5/2.5 | 1700 |
| 5//5/10 | 2840 |
| 20//10/10 | 6800 |
| 15//11/22 | 7040 |
| EHMA//LMA/MAA | |
| 10//10/12 | 5552 |
| EHMA//MMA/EHMA/MAA | |
| 10//5/5/12 | 4502 |
| EHMA//MMA/MAA | |
| 5//5/10 | 2350 |
| 5//10/10 | 2850 |
| EHMA//MAA | |
| 15//5 | 3400 |

| -continued | |
|---|---|
| | MOL. WEIGHT |
| BMA//BMA/MAA | |
| 5//2.5/2.5 | 1280 |
| 10//5/10 | 3000 |
| 20//10/20 | 6000 |
| 15//7.5/3 | 3450 |
| 5//5/10 | 2300 |
| 5//10/5 | 2560 |
| BMA//MMA/MAA | |
| 15//15/5 | 4060 |
| 15//7.5/3 | 3140 |
| 10//5/10 | 2780 |
| MMA//MMA/MAA | |
| 10//5/10 | 2360 |
| 10//5/5 | 1930 |
| 10//5/7.5 | 2150 |
| 20//5/7.5 | 3150 |
| 15//7.5/3 | 2770 |
| MMA//EHMA/MAA | |
| 5//5/10 | 2350 |
| 10//5/10 | 2850 |
| BMA/MMA//BMA/MAA | |
| 5/5//5/10 | 2780 |
| BMA//MAA | |
| 10//10 | 2260 |
| BMA//HEMA/MAA | |
| 15//7.5/3 | 3360 |
| 7.5//7.5/3 | 2300 |
| 15//7.5/7.5 | 3750 |
| BMA//BMA/DMAEMA | |
| 10//5/10 | 3700 |
| BMA//BMA/DMAEMA/MAA | |
| 10//5/5/5 | 2635 |
| BAB BLOCK POLYMER | |
| BMA/MAA//BMA//BMA/MAA | |
| 5/10//10//5/10 | 4560 |
| MMA/MAA//MMA//MMA/MAA | |
| 5/7.5//10//5/7.5 | 3290 |

Preferred block polymers are methyl methacrylate//methyl methacrylate/methacrylic acid (10//5/7.5), 2-ethylhexyl methacrylate//2-ethylhexyl methacrylate/methacrylic acid (5//5/10), n-butyl methacrylate//n-butyl methacrylate/methacrylic acid (10//5/10), n-butyl methacrylate//methacrylic acid (10//10)), ethylhexyl methacrylate//methyl methacrylate/methacrylic acid (5//10/10), n-butylmethacrylate//2-hydroxyethyl methacrylate/methacrylic acid (5//10/10), n-butylmethacrylate//2-hydroxyethyl methacrylate/methacrylic acid (15//7.5/3), methyl methacrylate//ethylhexyl methacrylate/methacrylic acid (5//5/10), and butyl methacrylate//butyl methacrylate/dimethylaminoethyl methacrylate (10//5/10).

To solubilize the B block into the aqueous medium, it may be necessary to make salts of either the acid or amino groups contained in the B block. Salts of the acid monomers can be made with the counter component being selected from organic bases such as mono-, di-, tri-methylamine, morpholine, n-methyl morpholine; alcohol amines such as dimethylethanolamine (DMEA), methyldiethanolamine, mono-, di-, and tri-ethanolamine; pyridine; ammonium hydroxide; tetra-alkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetra-alkyl ammonium salt. Amphoteric polymers, that is polymer that contains both an acid group and an amino group, may be used as is or can be neutralized with either addition of acid or base.

The AB and BAB polymers can be advantageously produced by stepwise polymerization process such as anionic or group transfer polymerization as described in Webster, U.S. Pat. No. 4,508,880, the disclosure of which is incorporated herein by reference. Polymers so produced have precisely controlled molecular weight, block sizes and very narrow molecular weight distributions. The polymer typically has a dispersity less than 2, generally in the range of 1.0 to 1.4. Dispersity is the polymer weight average molecular weight divided by its number average molecular weight. Number average molecular weight can be determined by gel permeation chromatography (GPC). The AB or BAB block polymers may also be formed by free radical polymerization wherein the initiation unit is comprised of two different moieties which initiate polymerization at two distinctly different temperatures. However, this method may cause contamination of the block copolymers with homopolymer and coupled products.

The AB block polymers also may be prepared using conventional anionic polymerization techniques, in which a first block of the copolymer is formed, and upon completion of the first block, a second monomer stream is started to form a subsequent block of the polymer. A low reaction temperature (e.g., 0° to −70° C.) is maintained in this case to minimize side reactions and form blocks of the desired molecular weights.

With many of these techniques, and especially with the group transfer polymerization process, the initiator may be non-functional, may contain an acid group (used as is or in a blocked form) or may contain an amino group. Either the hydrophobic A block or the hydrophilic B block may be made first. The BAB block polymers also may be prepared by anionic polymerization or group transfer polymerization techniques by first polymerizing one of the B Blocks, then polymerizing the hydrophobic A block, and then polymerizing the second B Block.

Random copolymers can be used as dispersants although not as effective in stabilizing pigment dispersions. Amongst these may be mentioned half-esters of maleic acid/styrene copolymers, lignin sulfonate derivatives and copolymers of acrylic and methacrylic acid with styrene.

COLORANTS

Colorants useful in practicing the invention comprise both pigments and dyes.

Pigments

Amongst pigments, a wide variety of organic and inorganic pigments, alone or in combination, may be selected to make the ink. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 micron. Preferably, the pigment particle size should range from 0.005 to 5 micron, next preferably from 0.005 to 1 micron more preferably, from 0.005 to 0.3 micron and still more preferably approximately 0.01-1 micron.

The selected pigment may be used in dry or wet form. For example, pigments are usually manufactured in aqueous media and the resulting pigment is obtained as water wet presscake. In presscake form, the pigment is not aggregated to the extent that it is in dry form. Thus, pigments in water wet presscake form do not require as much deaggregation in the process of preparing the inks from dry pigments. Representative commercial dry pigments that may be used in practicing the invention include the following:

| Pigment Brand Name | Manufacturer | Color Index Pigment |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | |
| L75-1331 Yellow | Sun Chem. | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | Violet 19 |
| Quindo ® Red R6713 | Mobay | Violet 19 |
| Indofast ® Violet | Mobay | Violet 23 |
| Monastral ® Violet Maroon B | Ciba-Geigy | Violet 42 |
| Monarch ® 1400 | Cabot | Black 7 |
| Monarch ® 1300 | Cabot | Black 7 |
| Monarch ® 1100 | Cabot | Black 7 |
| Monarch ® 1000 | Cabot | Black 7 |
| Monarch ® 900 | Cabot | Black 7 |
| Monarch ® 880 | Cabot | Black 7 |
| Monarch ® 800 | Cabot | Black 7 |
| Monarch ® 700 | Cabot | Black 7 |
| Raven 7000 | Columbian | Black 7 |

-continued

| Pigment Brand Name | Manufacturer | Color Index Pigment |
|---|---|---|
| Raven 5750 | Columbian | Black 7 |
| Raven 5250 | Columbian | Black 7 |
| Raven 5000 | Columbian | Black 7 |
| Raven 3500 | Columbian | Black 7 |
| Color Black FW 200 | Degussa | Black 7 |
| Color Black FW 2 | Degussa | Black 7 |
| Color Black FW 2V | Degussa | Black 7 |
| Color Black FW 1 | Degussa | Black 7 |
| Color Black FW 18 | Degussa | Black 7 |
| Color Black S 160 | Degussa | Black 7 |
| Color Black S 170 | Degussa | Black 7 |
| Special Black 6 | Degussa | Black 7 |
| Special Black 5 | Degussa | Black 7 |
| Special Black 4A | Degussa | Black 7 |
| Special Black 4 | Degussa | Black 7 |
| Printex U | Degussa | Black 7 |
| Printex V | Degussa | Black 7 |
| Printex 140U | Degussa | Black 7 |
| Printex 140V | Degussa | Black 7 |
| Tipure ® R-101 | Du Pont | White 6 |

Representative commercial pigments that can be used in the form of a water wet presscake include: Heucophthal ® Blue BT-585-P, Toluidine Red Y (C.I. Pigment Red 3), Quindo ® Magenta (Pigment Red 122), Magenta RV-6831 presscake (Mobay Chemical, Harmon Division, Haledon, N.J.), Sunfast ® Magenta 122 (Sun Chemical Corp., Cincinnati, Ohio), Indo ® Brilliant Scarlet (Pigment Red 123, C.I. No. 71145), Toluidine Red B (C.I. Pigment Red 3), Watchung ® Red B (C.I. Pigment Red 48), Permanent Rubine F6B13-1731 (Pigment Red 184), Hansa ® Yellow (Pigment Yellow 98), Dalamaro ® Yellow YT-839-P (Pigment Yellow 74, C.I. No. 11741, Sunbrite ® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

Dyes

Dyes commonly used in aqueous ink jet inks include for example Acid, Direct, Food and Reactive dyes.
Amongst useful dyes there may be mentioned:
C.I. Food Black 1
C.I. Food Black 2
C.I. Acid Black 7
C.I. Acid Black 24
C.I. Acid Black 26
C.I Acid Black 48
C.I. Acid Black 52
C.I Acid Black 58
C.I Acid Black 60
C.I Acid Black 107
C.I. Acid Black 109
C.I. Acid Black 118
C.I. Acid Black 119
C.I. Acid Black 131
C.I. Acid Black 140

C.I. Acid Black 155
C.I. Acid Black 156
C.I. Acid Black 187
C.I. Direct Black 17
C.I. Direct Black 19
C.I. Direct Black 32
C.I. Direct Black 38
C.I. Direct Black 51
C.I. Direct Black 71
C.I. Direct Black 74
C.I. Direct Black 75
C.I. Direct Black 112
C.I. Direct Black 117
C.I. Direct Black 154
C.I. Direct Black 163
C.I. Direct Black 168
C.I. Acid Red 1
C.I. Acid Red 8
C.I. Acid Red 17
C.I. Acid Red 32
C.I. Acid Red 35
C.I. Acid Red 37
C.I. Acid Red 42
C.I. Acid Red 57
C.I. Acid Red 92
C.I. Acid Red 115
C.I. Acid Red 119
C.I. Acid Red 131
C.I. Acid Red 133
C.I. Acid Red 134
C.I. Acid Red 154
C.I. Acid Red 186
C.I. Acid Red 249
C.I. Acid Red 254
C.I. Acid Red 256
C.I. Direct Red 37
C.I. Direct Red 63
C.I. Direct Red 75
C.I. Direct Red 79
C.I. Direct Red 80
C.I. Direct Red 83
C.I. Direct Red 99
C.I. Direct Red 220
C.I. Direct Red 224
C.I. Direct Red 227
C.I. Acid Violet 11
C.I. Acid Violet 34
C.I. Acid Violet 75
C.I. Direct Violet 47
C.I. Direct Violet 48
C.I. Direct Violet 51
C.I. Direct Violet 90
C.I. Direct Violet 94
C.I. Reactive Red 4
C.I. Reactive Red 23
C.I. Reactive Red 24
C.I. Reactive Red 31
C.I. Reactive Red 56
C.I. Acid Blue 9
C.I. Acid Blue 29
C.I. Acid Blue 62
C.I. Acid Blue 102
C.I. Acid Blue 104
C.I. Acid Blue 113
C.I. Acid Blue 117
C.I. Acid Blue 120
C.I. Acid Blue 175
C.I. Acid Blue 183
C.I. Direct Blue 1
C.I. Direct Blue 6
C.I. Direct Blue 8
C.I. Direct Blue 15
C.I. Direct Blue 25
C.I. Direct Blue 71
C.I. Direct Blue 76
C.I. Direct Blue 78
C.I. Direct Blue 80
C.I. Direct Blue 86
C.I. Direct Blue 90
C.I. Direct Blue 106
C.I. Direct Blue 108
C.I. Direct Blue 123
C.I. Direct Blue 163
C.I. Direct Blue 165
C.I. Direct Blue 199
C.I. Direct Blue 226
C.I. Reactive Blue 7
C.I. Reactive Blue 13
C.I. Acid Yellow 3
C.I. Acid Yellow 17
C.I. Acid Yellow 19
C.I. Acid Yellow 23
C.I. Acid Yellow 25
C.I. Acid Yellow 29
C.I. Acid Yellow 38
C.I. Acid Yellow 49
C.I. Acid Yellow 59
C.I. Acid Yellow 61
C.I. Acid Yellow 72
C.I. Direct Yellow 27
C.I. Direct Yellow 28
C.I. Direct Yellow 33
C.I. Direct Yellow 39
C.I. Direct Yellow 58
C.I. Direct Yellow 86
C.I. Direct Yellow 100
C.I. Direct Yellow 142
C.I. Reactive Yellow 2.

AQUEOUS CARRIER MEDIUM

The aqueous carrier medium is water or a mixture of water and at least one water soluble organic solvent other than the penetrant.

Deionized water is commonly used. Selection of a suitable mixture of water and water soluble organic solvent, depends on requirements of the specific application, such as desired surface tension and viscosity, the selected pigment, drying time of the pigmented ink jet ink, and the type of paper onto which the ink will be printed.

Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol, 1,2,6-hexanetriol and thiodiglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of a water soluble organic solvent having at least 2 hydroxyl groups such as, diethylene glycol and water is preferred as the aqueous carrier medium. In the case of a mixture of water, diethylene glycol and penetrant, the aqueous carrier medium plus penetrant usually contains from about 30% water/70% solvent/penetrant mixture to about 95% water/5% solvent/penetrant mixture. The preferred ratios are approximately 60% water/40% solvent/penetrant mixture to about 95% water/5% solvent/penetrant mixture. The solvent/penetrant mixture contains 15-95% penetrant, preferably 25-75%.

Percentages are based on the total weight of the aqueous carrier medium plus penetrant.

OTHER INGREDIENTS

The ink may contain other ingredients. For example, surfactants may be used to alter surface tension as well as promote penetration. However, they may also destabilize pigmented inks. Surfactants may be anionic, cationic, amphoteric or nonionic. Useful surfactants may be selected from McCutcheon's Emulsifiers and Detergents, published by Manufacturing Confectioners Publishing Company, Glen Rock, N.J. The choice of surfactant is highly dependent on the type of paper to be printed. It is expected that one skilled in the art can select the appropriate surfactant for the specific paper to be used in printing.

For example, the following surfactants were found to be useful in printing on Gilbert Bond paper (25% cotton) designated style 1057 manufactured by Mead Company, Dayton, Ohio.

| Supplier and Tradename | Description |
|---|---|
| Air Products | |
| Surfynol ® 465H | Ethoxylated Tetramethyl Decynediol |
| Surfynol ® CT-136 | Acethylenic Diol, Anionic Surfactant Blend |
| Surfynol ® GA | Acetylenic Diol Blend |
| Surfynol ® TG | Acetylenic Diol Blend in Ethylene Glycol |
| Cyanamid | |
| Aerosol ® OT | Dioctyl Ester of Sodium Sulfosuccinic Acid |
| | Aerosol ® MA-80 Dihexyl Ester of Sodium Sulfosuccinic Acid Aerosol ® MA-80/Aerosol OT 2/1 |
| Du Pont | |
| Duponol ® RA | Fortified Sodium Ether-Alcohol Sulfate |
| Merpol ® A | Ethylene Oxide, Ester Condensate |
| Merpol ® LF-H | Polyether |
| Merpol ® SE | Alcohol Ethoxylate |
| Merpol ® SH | Ethylene Oxide Condensate |
| Zelec ® NK | Alcohol Phosphate Composition |
| Fisher Scientific | |
| Polyethylene Glycol 3350 | |
| Polyethylene Glycol 400 | |
| Polyethylene Glycol 600 | |
| ICI | |
| Renex ® 30 | Polyoxyethylene (12) Tridecyl Ether |
| Synthrapol ® KB | Polyoxyethylene Alkyl Alcohol |
| Rohm & Haas | |
| Triton ® CF 10 | Alkylaryl Polyether |
| Triton ® CF 21 | Alkylaryl Polyether |
| Triton ® N 111 | Nonylphenoxy Polyethoxy Ethanol |
| Triton ® X 102 | Octylphenoxy Polyethoxy Ethanol |
| Triton ® X 114 | Octylphenoxy Polyethoxy Ethanol |
| Union Carbide | |
| Silwet ® L-7600 | Polyalkyleneoxide Modified Polydimethylsiloxane |
| Silwet ® L-7607 | Polyalkyleneoxide Modified Polydimethylsiloxane |
| Silwet ® L-77 | Polyalkyleneoxide Modified Polydimethylsiloxane |
| UCON ® ML1281 | Polyalkylene Glycol |
| W. R. Grace | |
| Hampshire Div., Hamposyl ® Lida | Lauryoyl Iminodiacetic Acid. |

In aqueous inks, the surfactants may be present in the amount of 0.01-5% and preferably 0.2-2%.

Biocides may be present to inhibit growth of microorganisms. Dowicides (Dow Chemical, Midland MI), Omidines (Olin Corp.), Nopcocides (Henkel Corp.) and sodium benzoate may be used.

In addition, sequestering agents such as EDTA may also be included to eliminate deleterious effects of heavy metal impurities.

INK PREPARATION

The pigmented ink is prepared by premixing the selected pigment(s) and acrylic block copolymer in water. In the case of dyes some of the same factors apply except that there is no dispersant present and no need for pigment deaggregation. The dye-based ink is prepared in a well agitated vessel rather than in dispersing equipment. Cosolvents and penetrant may be present during the dispersion.

The dispersing step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium.

It is generally desirable to make the pigmented ink jet ink in concentrated form. The concentrated pigmented ink jet ink is subsequently diluted to the appropriate concentration for use in the ink jet printing system. This technique permits preparation of a greater quantity of pigmented ink from the equipment. If the pigment dispersion is made in a solvent, it is diluted with water and optionally other solvents to obtain the appropriate concentration. If the pigment dispersion is made in water, it is diluted with either additional water or water soluble solvents to make a pigment dispersion of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 15%, preferably approximately 0.1 to 8%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, because inorganic pigments generally have higher specific gravities than organic pigments. The acrylic block polymer is present in the range of approximately 0.1 to 30% by weight of the total ink composition, preferably in the range of approximately 0.1% to 8%. If the amount of polymer becomes too high, the ink color density will be unacceptable and it will become difficult to maintain desired ink viscosity. Dispersion stability of the pigment particles is adversely affected if insufficient acrylic block copolymer is present. The amount of aqueous carrier medium plus penetrant is in the range of approximately 70 to 99.8%, preferably approximately 94 to 99.8%, based on total weight of the ink when an organic pigment is selected, approximately 25 to 99.8%, preferably approximately 70 to 99.8% when an inorganic pigment is selected and 80 to 99.8% when a dye is selected.

Other additives, such as surfactants, biocides, humectants, chelating agents, and viscosity modifiers may be added to the ink. Optionally, other acrylic and non-acrylic polymers, may be added to improve properties such as water fastness and smear resistance.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The inks have excellent storage stability for a long period and do not clog in an ink jet apparatus. Fixing the ink on the image recording material, such as, paper, fabric, film, etc., can be carried out rapidly and accurately. The printed ink images have clear color tones, high density, excellent water resistance and lightfastness. Furthermore, the ink does not corrode parts of the ink jet printing device it comes in contact with, and it is essentially odorless, and non-toxic.

The following examples serve to illustrate the practice of the present invention.

EXAMPLES 1–7

All inks were prepared as follows:
Dispersant Preparation:

A block copolymer of n-butyl methacrylate and methacrylic acid was prepared as follows:

3750 grams of tetrahydrofuran, 7.4 grams of p-xylene, were added to a 12-liter flask equipped with a mechanical stirrer, thermometer, nitrogen inlet, drying tube outlet, and addition funnels. The catalyst, tetrabutyl ammonium m-chlorobenzoate, and 3.0 ml of a 1.0 M solution in acetonitrile, was then added to the flask. 291.1 grams (1.25 M) of an initiator, 1,1-bis(trimethylsiloxy)-2-methyl propene, was injected. Feed I which consisted of tetrabutyl ammonium m-chlorobenzoate, and 3.0 ml of a 1.0 M solution in acetonitrile, was started and added over 150 minutes. Feed II which consisted of 1976 gm (12.5M) trimethylsilyl methacrylate, was started at 0.0 minutes and added over 35 minutes. One hundred and eighty minutes after Feed II was completed over 99% of the monomers had reacted. Feed III, which consisted of 1772 gm (12.5 M) butyl methacrylate, was started and added over 30 minutes.

At 400 minutes, 780 grams of dry methanol was added to the above solution and distillation commenced. During the first stage of distillation, 1300.0 grams of material with a boiling point below 55° C. was removed from the flask. The theoretical amount of methoxytrimethylsilane, having a boiling point of 54° C., (BP =54° C.) to be removed was 1144.0 grams. Distillation continued during the second stage while the boiling point increased to 76° C. Isopropanol, 5100 gms, was added during the second stage of distillation. A total of 7427 grams of solvent were removed. The resultant resin solution was used directly in the next step. It contained 55.8% solids and had a neutralization equivalent of 4.65 milliequivalents of potassium hydroxide per gram of solids.

Neutralization of Dispersant:

The following materials were added to a 1000 ml cylindrical polyethylene bottle:

200.0 grams dispersant solution
174.4 grams 15% potassium hydroxide
137.6 grams deionized water The mixture was tumbled on a roller mill for 3–4 hours and then magnetically stirred for 16–20 hours to give a slightly cloudy solution.

Preparation of Pigment Dispersion:

The following materials were added to a 1 liter beaker:

78.3 grams deionized water
66.7 grams neutralized dispersant solution
3.0 grams 15% potassium hydroxide The solution was mechanically stirred while 20.0 grams of carbon black pigment, FW 18 (Degussa Corp., Ridgefield Park, N.J. 07660) was added in portions. Stirring was continued for 30 minutes. The contents were then added to a Mini Motormill 100 (Eiger Machinery Inc., Bensenville, Ill. 60106) with another 32 grams of deionized water as a rinse. The contents were milled at 3500 rpm for one hour. The yield was 190.8 grams. The pH was 7.6. The particle size was 138 nm as determined by a Brookhaven BI-90 Particle analyzer (Brookhaven Instruments. Corp., Holtsville, N.Y. 11742).

Preparation of Inks:

The following ingredients were combined and added with magnetic stirring over 10–15 minutes to 22.5 grams of pigment dispersion:

2.6 grams diethylene glycol (Aldrich Chemical Co. Inc., Milwaukee, Wis. 53233)
2.6 grams comparative cosolvent or diol penetrant
0.5 grams Silwet ® L-77 (Union Carbide Corp., Danbury, Conn. 06817)
37.2 grams deionized water.

TABLE 1

Control Cosolvent And Diol Penetrant Identification

All cosolvents and diol penetrants were obtained from Aldrich Chemical Co. Inc., Milwaukee, Wis. 53233 unless otherwise stated. A cosolvent or diol penetrant was added to the ink as previously discussed. The cosolvents and diol penetrants are identified as follows:

| Comparative Cosolvents | Control # |
|---|---|
| Butyl Carbitol (Union Carbide Copr., Danbury, CT 06817) | 1 |
| Dowanol TBH, (Dow Chemical, Midland MI 48640) | 2 |
| Dipropylene Glycol | 3 |
| Hexylene Glycol | 4 |
| Neopentyl Glycol | 5 |
| Triethylene Glycol | 6 |
| Glycerol | 7 |

| Diol Penetrants | Example # |
|---|---|
| 2-Ethyl-2-methyl-1,3-propanediol | 1 |
| 3,3-Dimethyl-1,2-butanediol | 2 |
| 2,2-Diethyl-1,3-propanediol | 3 |
| 2-Methyl-2-propyl-1,3-propanediol | 4 |
| 2,4-Dimethyl-2,4-pentanediol | 5 |
| 2,5-Dimethyl-2,5-hexanediol | 6 |
| 5-Hexene-1,2-diol | 7 |

TABLE 2

Drying Times

Drying times were obtained by printing rapidly a series of solid patterns on a Hewlett Packard DeskJet printer (Hewlett Packard Co., Palo Alto, Calif. 94303) and immediately wiping them in 15 second increments, and recording the time in which the printed ink would no longer smear. A semiabsorbent paper, Gilbert Bond (Mead Co., Dayton, Ohio) was used.

| Sample | | Dry Time, seconds |
|---|---|---|
| Control | 1 | <15 |
| Control | 2 | <15 |
| Control | 3 | 15–30 |
| Control | 4 | 15–30 |
| Control | 5 | 15–30 |
| Control | 6 | 15–30 |
| Control | 7 | 30–45 |
| Example | 1 | <15 |
| | 2 | <15 |
| | 3 | <15 |
| | 4 | <15 |
| | 5 | <15 |
| | 6 | <15 |
| | 7 | <15 |

Dispersion stability was obtained by subjecting 15 grams of ink to four temperature cycles, each consisting of 4 hours at −20° C. and 4 hours at 60° C. Particle sizes were measured on a Brookhaven BI-90 (Brookhaven Instruments Corp., Holtsville, N.Y. 11742) before and after cycling.

TABLE 3

Dispersion Stability

| Sample | | Change in Particle Size, delta nanometers |
|---|---|---|
| Control | 1 | 36 |
| | 2 | 22 |
| | 3 | 4 |
| | 4 | 2 |
| | 5 | 4 |
| | 6 | 3 |
| | 7 | −5 |
| Example | 1 | 3 |
| | 2 | 4 |
| | 3 | 17 |
| | 4 | 7 |
| | 5 | 0 |
| | 6 | 6 |
| | 7 | 12 |

TABLE 4

Crust Times

Crust times were obtained on a Deskjet printer that had been altered so that the ink cartridge would not be vacuum suctioned nor spit into a spittoon. The last time interval that the particular drop did not fail is recorded.

| Sample | | 1st seconds | 5th minutes | 32nd minutes | Drop· minutes |
|---|---|---|---|---|---|
| Control | 1 | 90 | | 1 | 1.5 |
| | 2 | 60 | | 1 | 3.0 |
| | 3 | 55 | | 2 | 5.0 |
| | 4 | 40 | | 0.5 | 1.5 |
| | 5 | 35 | | 1 | 1.5 |
| | 6 | 40 | | 1 | 1.1 |
| | 7 | 25 | | 0.75 | 1.0 |
| Example | 1 | 70 | | 1.0 | 2.0 |
| | 2 | 60 | | 1.3 | 2.5 |
| | 3 | 60 | | 1.3 | 15 |
| | 4 | 55 | | 1.6 | 4.5 |
| | 5 | 45 | | 0.5 | 10 |
| | 6 | 40 | | 1.1 | 20 |
| | 7 | 45 | | 1.0 | 1.5 |

TABLE 5

Optical Densities

Optical densities were obtained on the print side as well as the backside of the paper using a Macbeth RD 918 Densitometer (Macbeth).

| Sample | | Print or Front Density Units | Strikethrough or Back Density Units |
|---|---|---|---|
| Control | 1 | 1.05 | 0.17 |
| | 2 | 1.05 | 0.17 |
| | 3 | * | * |
| | 4 | 1.10 | 0.11 |
| | 5 | 1.22 | 0.11 |
| | 6 | 1.30 | 0.12 |
| | 7 | 1.38 | 0.12 |
| Example | 1 | 1.09 | 0.11 |
| | 2 | 1.05 | 0.17 |
| | 3 | 1.05 | 0.16 |
| | 4 | 1.13 | 0.18 |
| | 5 | 1.09 | 0.13 |
| | 6 | 1.13 | 0.12 |
| | 7 | 1.16 | 0.12 |

* Printed poorly in solid patterns so that reliable data could not be obtained.

The best situation maximizes front density and back density where small drop volumes will produce dots that spread to maximum area. Spreading is maximized when back densities are 0.16–0.18.

What is claimed is:

1. An aqueous ink jet ink composition comprising:
   (a) an aqueous carrier medium,
   (b) a pigment dispersion or dye; and
   (c) an aliphatic diol penetrant compound having at least 6 carbon atoms, a solubility in water of at least 4.5 parts in 100 parts of water at 25° C., and selected from the group consisting of
      (1) compounds wherein at least 2 carbon atoms are attached as substituents to the main chain and represented by the general formula $C_nH_{2n}(OH)_2$ wherein n is at least 6; and
      (2) Hexene [1,2-] diols.

2. The ink composition of claim 1 wherein the pigment dispersion comprises a pigment and a polymeric dispersant.

3. The ink composition of claim 1 wherein n is 6–8.

4. The ink composition of claim 1 wherein at least 2 side chain or branched carbon atoms are attached to the same main chain carbon atom.

5. The ink composition of claim 1 wherein the diol penetrant is a 1,3-diol having the general formula:

$$\begin{array}{c} CH_2OH \\ | \\ R-C-CH_2OH \\ | \\ R' \end{array}$$

wherein R is H or alkyl of 1–2 carbon atoms and R' is alkyl of 2–6 carbon atoms.

6. The ink composition of claim 5 wherein R is $-CH_3$ or $-C_2H_5$, and R' is $C_2H_5$ or $C_3H_7$.

7. The ink composition of claim 6 wherein the diol penetrant is 2-ethyl-2-methyl-1,3-propanediol.

8. The ink composition of claim 6 wherein the diol penetrant is 2,2-diethyl-1,3-propanediol.

9. The ink composition of claim 6 wherein the diol penetrant is 2-methyl2-propyl-1,3-propanediol.

10. The ink of claim 1 wherein the diol penetrant is a 2,4- or 2,5-diol having the general formula:

$(CH_3)_2COH(CH_2)_nCOH(CH_3)_2$ wherein n=1–2.

11. The ink composition of claim 10 wherein the diol penetrant is 2,4-dimethyl-2,4-pentanediol.

12. The ink composition of claim 10 wherein the diol penetrant is 2,5-dimethyl-2,5-hexanediol.

13. The ink composition of claim 4 wherein the diol penetrant is 3,3-dimethyl-1,2-butanediol.

14. The ink composition of claim 1 or 2 wherein the diol penetrant is 5-hexene-1,2-diol.

15. The ink composition of claim 2 wherein the polymeric dispersant is an AB or BAB block copolymer wherein
   (a) the A segment is a hydrophobic homopolymer or copolymer of an acrylic monomer having the formula:

$CH_2=C(X)(Y)$ wherein X is H or $CH_3$; and Y is $C(O)OR_1$, $C(O)NR_2R_3$, or CN, wherein $R_1$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and
   (b) the B segment is a hydrophilic polymer, or salt thereof, of
      (1) an acrylic monomer having the formula $CH_2=C(X)(Y_1)$, wherein X is H or $CH_3$; and $Y_1$ is $C(O)OH$, $C(O)NR_2R_3$, $C(O)OR_4NR_2R_3$ or $C(OR_5)$; wherein $R_2$ and $R_3$ are hydrogen or an alkyl, aryl, or alkylaryl group having 1 to 9 carbon atoms; $R_4$ is an alkyl diradical having 1 to 5 carbon atoms; and $R_5$ is an alkyl diradical having 1 to 20 carbon atoms and optionally containing one or more hydroxyl or ether groups; or
      (2) a copolymer of the acrylic monomer of (1) with an acrylic monomer having the formula:

$CH_2=C(X)(Y)$ where X and Y are the substituent groups defined for the A segment; the B segment having an average molecular weight of at least approximately 300, and being water soluble.

16. The pigmented ink of claim 15 wherein the polymeric dispersant is an AB or BAB block copolymer wherein the A segment of said block copolymer is a homopolymer or copolymer prepared from at least one monomer selected from the group consisting of methyl methacrylate, ethylmethacrylate, propyl methacrylate, butyl methacrylate, hexyl methacrylate, 2-ethylhexyl methacrylate, octyl methacrylate, lauryl methacrylate, stearyl methacrylate, phenyl methacrylate, benzyl methacrylate, hydroxyethyl methacrylate, hydroxypropyl methacrylate, 2-ethoxyethyl methacrylate, methacrylonitrile, 2-trimethylsiloxyethyl methacrylate, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, benzyl acrylate, hydroxyethyl acrylate, hydroxypropyl acrylate, acrylonitrile, 2-trimethyl-siloxyethyl acrylate, glycidyl acrylate, p-tolyl acrylate, and sorbyl acrylate.

17. The ink composition of claim 16 wherein the A segment of said block copolymer is a homopolymer or copolymer prepared from methyl methacrylate, n-butyl methacrylate, 2-ethylhexyl methacrylate or a copolymer ethyl methacrylate with butyl methacrylate.

18. The ink composition of claim 17 wherein the A segment is n-butyl methacrylate.

19. The ink composition of claim 15 wherein the B segment of said block copolymer is a homopolymer or copolymer prepared from at least one monomer selected from the group consisting essentially of methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide.

20. The ink composition of claim 19 wherein the B segment of said block copolymer is a polymer of methacrylic acid or dimethylaminoethyl methacrylate.

21. The ink composition of claim 20 wherein the B segment of said block copolymer is a homopolymer polymer of methacrylic acid.

22. The ink composition of claim 20 wherein said ink contains approximately 0.1 to 15% pigment, 0.1 to 30% block copolymer, and 70 to 99.8% aqueous carrier medium plus penetrant, based on the weight of the total ink composition.

23. The ink composition of claim 22 wherein the aqueous carrier medium comprises water and at least one water soluble organic solvent.

24. The ink composition of claim 23 wherein aqueous carrier medium plus penetrant contains from 30% water/70% solvent/penetrant mixture to 95% water/5% solvent/penetrant mixture, based on the total weight of the aqueous carrier medium plus penetrant.

25. The ink composition of claim 24 wherein the solvent/penetrant mixture contains 15–95% penetrant, based on the weight of the solvent/penetrant mixture.

26. The ink composition of claim 25 wherein the solvent/penetrant mixture contains 25–75% penetrant, based on the weight of the solvent/penetrant mixture.

27. The ink composition of claim 22 wherein said ink contains approximately 0.1 to 8% pigment, 0.1 to 8% block copolymer, and 94 to 99.8% aqueous carrier medium plus penetrant, based on the weight of the total ink composition.

28. The ink composition of claim 15 wherein the A segment of said block copolymer is a polymer of methyl methacrylate, butyl methacrylate, or 2-ethylhexyl methacrylate and the B segment is a polymer of methacrylic acid or dimethylaminoethyl methacrylate.

29. The ink composition of claim 15 wherein the B segment(s) constitute approximately 25 to 65%, by weight, of said block copolymer.

30. The ink composition of claim 1 wherein said ink contains approximately 0.2 to 20% dye, and 80 to 99.8% aqueous carrier medium plus penetrant, based on the weight of the total ink composition.

31. The ink composition of claim 30 wherein said aqueous carrier medium plus penetrant contains 15–95% penetrant based on the weight of the aqueous carrier medium plus penetrant.

32. The ink of claims 1 or 2 wherein the aqueous carrier medium is a mixture of water and at least one water soluble organic solvent having at least 2 hydroxyl groups.

33. The ink composition of claim 2 wherein the pigment particles have a median particle size of approximately 0.01 to 1 micron.

34. The ink composition of claim 2 wherein the polymeric dispersant is neutralized with a neutralizing agent selected from the group consisting of organic bases, alkanolamines, alkali metal hydroxides, and mixtures thereof.

35. An ink composition of claims 1 or 2 wherein a surfactant is present.

36. An ink composition of claim 35 wherein the surfactant is a polyalkyleneoxide modified polydimethylsiloxane.

* * * * *